United States Patent [19]
Goldsmith

[11] Patent Number: 5,106,502
[45] Date of Patent: Apr. 21, 1992

[54] POROUS INORGANIC MEMBRANE WITH REACTIVE INORGANIC BINDER

[75] Inventor: Robert L. Goldsmith, Belmont, Mass.

[73] Assignee: CeraMem Corporation, Waltham, Mass.

[21] Appl. No.: 574,459

[22] Filed: Aug. 29, 1990

Related U.S. Application Data

[62] Division of Ser. No. 198,195, May 24, 1988, Pat. No. 4,983,423.

[51] Int. Cl.$^5$ .............................................. B01D 71/04
[52] U.S. Cl. .................................. 210/490; 210/500.25; 210/500.26
[58] Field of Search ............... 210/490, 500.25, 500.26, 210/504, 505, 506, 508, 509, 496, 510.1; 427/230, 245, 246

[56] References Cited

U.S. PATENT DOCUMENTS 4,889,630 12/1989 Reinhardt et al. .............. 210/505 X
4,983,423 1/1991 Goldsmith ........................ 427/230

Primary Examiner—Frank Spear
Attorney, Agent, or Firm—Richard P. Crowley

[57] ABSTRACT

A porous inorganic membrane for use with a membrane device having a porous support, the membrane including refractory particles bound to each other and to the support by a thermally reactive inorganic binder which reacts at a temperature below that at which the refractory particles react. Further, a method of forming a porous inorganic membrane on a support by applying a coating of a mixture of refractory particles and a thermally reactive inorganic binder to the support. The inorganic binder reacts at a first temperature lower than a second temperature at which the refractory particles sinter. The method further includes firing the support to a firing temperature at least as high as the first temperature and less than the second temperature to react the inorganic binder, and cooling the support to form the porous membrane.

26 Claims, No Drawings

POROUS INORGANIC MEMBRANE WITH REACTIVE INORGANIC BINDER

This application is a division of application Ser. No. 198,195, filed May 24, 1988, now U.S. Pat. No. 4,983,423.

FIELD OF INVENTION

This invention relates to a porous inorganic membrane formed of refractory particles, and more particularly to such a membrane whose particles are bound by an inorganic binder which thermally reacts, by melting or sintering, at a lower temperature than that of the refractory particles.

BACKGROUND OF INVENTION

There are an increasing number of applications for porous coatings. In the field of membrane separations, thin, porous membranes deposited on porous supports are widely used for microfiltration and ultrafiltration of liquid media and for gas separations.

There are several types of inorganic membranes: metallic membranes, glass membranes, inorganic polymer membranes, and ceramic membranes. Ceramic membranes in particular provide high thermal stability, chemical stability, and wear resistance.

Ceramic membranes are porous and usually have a composite structure. The structure consists of a macroporous support for mechanical strength onto which are coated one or more thin ceramic layers which perform the actual separation. When more than one layer is employed, the layers are coated sequentially onto the support, with layer pore size decreasing with the successive application of the layers.

Porous support materials include alumina, cordierite, mullite, silica, spinel, zirconia, other refractory oxides and various oxide mixtures, carbon, sintered metals (stainless steel or nickel), and silicon carbide. Ceramic materials for the membrane layers include silicon carbide, silicon nitride, and most commonly, ceramic oxides. Such oxides include silica, alumina, zirconia, zircon, and titania, and in some instances, mixtures of the above. Alumina, zirconia, and silicon carbide are found in commercially available membrane devices.

A preferred method of coating involves slip casting of suspensions of ceramic particles or inorganic colloids onto a porous support. In the slip-casting process, the porous support is brought into contact with the slip, for example, by filling a cavity to be coated, and after a few seconds the slip is drained from the cavity. Due to capillarity in the support, the liquid medium (the "vehicle") of the slip is aspirated into the porous support, and particles or colloids in the slip of a size larger than the pores, are filtered to form a cake at the support interface.

An alternative method of coating layers of ceramic particles or inorganic colloids onto a porous support is dynamic filtration. In dynamic filtration a suspension of particles or colloids is filtered by the porous support in either a normal filtration mode or in a cross-flow filtration mode. Membranes coated by cross-flow filtration are also known as dynamic membranes.

The layers of ceramic particles or inorganic colloids coated onto the porous support by slip casting or dynamic filtration can be fired at an elevated temperature to sinter the particles together, thus obtaining a strong, stable ceramic membrane.

Several considerations and limitations are important in slip casting thin porous ceramic membrane layers. The porous support usually has a pore size of 10 to 20 microns. Accordingly, the initial layer or layers are comprised of ceramic particles of size larger than 1 micron. Ceramic particles used to form such coatings are normally of a single composition and have narrow particle size distributions. These characteristics lead to a requirement for sintering at a relatively high temperature. Alpha-alumina microfilters, for example, are typically fired at 1,500° C. to 1,600° C. Careful control of the time-temperature profile to achieve the desired layer porosity and pore size is important.

The high sintering temperatures for refractory ceramic particles limit the selection of support materials. For example, porous cordierite has a melting point of about 1,450° C. and cannot be used as a support for alpha-alumina particles above 1 micron in size, which require a sintering temperature in excess of 1,500° C.

Further, a large difference in the coefficient of expansion between the ceramic particles and the support material cannot be tolerated. On firing and cooldown, especially if the ceramic particles sinter at an elevated temperature, crazing or peeling of the membrane coating can impair its separation capability. For example, alpha-alumina and cordierite have coefficients of expansion of $7-8 \times 10^{-6}/°$ C. and $1.0-1.2 \times 10^{-6}/°$ C., respectively. Sintered coatings of alpha-alumina on a porous cordierite support can be expected to craze on cooldown after sintering.

Further, high firing temperatures require expensive furnaces capable of achieving the high temperatures and high energy costs for firing.

SUMMARY OF INVENTION

It is therefore an object of this invention to provide an improved porous inorganic membrane for a membrane device.

It is a further object of this invention to provide an improved method of forming a porous inorganic membrane utilizing lower firing temperatures.

A still further object of this invention is to provide such a method which requires less stringent time-temperature control during membrane firing.

It is a further object of this invention to provide such a method which enables use of membrane supports that can withstand only relatively low temperatures.

It is a further object of this invention to provide an improved porous inorganic membrane which can be formed on a support with a dissimilar coefficient of expansion.

A still further object of this invention is to provide such a method which can be accomplished using inexpensive furnaces and low energy costs.

This invention results from the realization that a truly effective porous inorganic membrane formed of refractory particles, that is, particles which are not significantly deformed or altered until a very high temperature is reached, can be achieved by mixing the refractory particles with a thermally reactive inorganic binder which reacts at a temperature substantially lower than that of the refractory particles so that a relatively low firing temperature can be utilized.

This invention features a method of forming a porous inorganic membrane on a support. The method includes applying a coating of a mixture of refractory particles and a thermally reactive inorganic binder to the support to form a first layer, the inorganic binder reacting at a first temperature which is lower than a second temperature at which the refractory particles sinter. The support is fired to a firing temperature at least as high as the first temperature and less than a second temperature to react with the inorganic binder, and the support is cooled to form the porous organic membrane from the first layer having the refractory particles bound to each other and to the support by the inorganic binder.

In one embodiment, the refractory particles are a ceramic selected from the group consisting of silicon carbide, silicon nitride, silica, alumina, zirconia, zircon, mullite, cordierite, titantia, spinel, thoria, hematite, and hafnia. Alternatively, the inorganic binder includes a glass frit having a melting point between 600°–1,200° C. and having a particle size less than or equal to the size of the refractory particles.

In yet another embodiment, the inorganic binder includes fine reactive ceramic particles less than 1 micron in size selected from the group consisting of alumina, zirconia, titania, silica, zircon, silicon carbide, and silicon nitride. Alternatively, the inorganic binder includes an inorganic colloidal material selected from the group consisting of colloidal silica, alumina, zirconia, titania, ceria, yttria, tin oxide, silicon carbide, silicon nitride, and mixtures thereof, and has a particle size below 100 millimicrons. In another embodiment, the mixture further includes a liquid vehicle and the inorganic binder includes a soluble inorganic material dissolved in the liquid vehicle. The inorganic material converts on firing to alumina, silica, titania, or zirconia.

In still another embodiment, the inorganic binder ranges from 2.5 wt % to 200 wt %, preferably from 10 wt % to 100 wt %, relative to the weight of refractory particles. The refractory particles and the inorganic binder are carried by a liquid vehicle, and method further includes drying the support before firing to drive off the liquid vehicle. The mixture further includes a viscosity modifier for controlling the viscosity of the mixture. Additionally, the mixture includes an organic binder for adhering together the refractory particles and the inorganic binder as a coating when they are applied to the support and dried. The coating may be applied by slip casting or by dynamic filtration. The porous material is selected from the group consisting of ceramics and metals, and is a porous tube. The coating is applied on at least one of the inner and outer surfaces. Alternatively, the support is a porous monolith having a plurality of passageways, and the coating is applied on the surfaces of the monolith passageways.

In yet another embodiment, the method further includes applying at least one successive coating of inorganic particles to the support to overlie the first layer. The inorganic coating particles of each successive coating may be smaller in size than the inorganic coating particles in an underlying layer. At least one of the successive coatings is a mixture of refractory particles as the inorganic coating particles and a thermally reactive inorganic binder. The method further includes applying the mixture to the support after cooling the support, refiring the support to a firing temperature less than the second temperature of the refractory particles in any underlying layer and in the successive coating until the inorganic binder in the successive coating reacts, and cooling the support to form a composite porous inorganic membrane.

In another embodiment, at least one of the successive coatings is inorganic particles smaller in size than the inorganic coating particles in an underlying layer, and the method further includes applying the inorganic coating particles to the support after cooling the support, refiring the support to a firing temperature below the second temperature of the inorganic coating particles of any underlying layer until the inorganic coating particles in the successive coating sinter and cooling the support to form a composite porous inorganic membrane.

In yet another embodiment, at least one of the successive coatings is inorganic coating particles, and the method further includes applying the coating to the support after cooling the support and refiring the support to a firing temperature below the second temperature of inorganic coating particles of any underlying layer until a glass frit in the underlying layer melts and flows into the successive coating. In any of the above methods, the underlying layer may be dried, but not fired, prior to application of the successive coating.

This invention also features a membrane device having a porous support and a porous inorganic membrane adhered to the support. The membrane includes refractory particles bound to each other and to the support by a thermally reactive inorganic binder which reacts at a temperature below that at which the refractory particles react. The inorganic binder may be a glass frit or reactive ceramic particles having a size smaller than that of the refractory particles. The inorganic binder reacts at a temperature below that at which the support reacts.

DISCLOSURE OF PREFERRED EMBODIMENTS

Other objects, features and advantages will occur from the following description of preferred embodiments.

This invention may be accomplished by a porous inorganic membrane having refractory particles held by a thermally reactive inorganic binder, and a method of forming same. The inorganic binder reacts at a temperature which is lower than that at which the refractory particles sinter to accommodate relatively low firing temperatures. The refractory particles are particles which are not significantly deformed or altered until relatively high temperatures are achieved. In contrast, the inorganic binder reacts at a significantly lower temperature. The term "reacts" includes melting, sintering, or otherwise responding to heat to bond the refractory particles to each other and to the support.

In one construction, a membrane device according to this invention is fabricated by mixing refractory ceramic particles and a thermally reactive inorganic binder in a liquid vehicle. A coating of the mixture is applied to a porous support by slip casting or dynamic filtration. The coated support is dried to drive off the liquid vehicle and then fired to a temperature below that at which the refractory particles sinter or otherwise react, yet sufficiently high to react the inorganic binder. Upon cooling of the support, a strong, porous inorganic membrane is formed which has a porosity established by the size and packing characteristics of the refractory particles. In other words, the inorganic binder bonds the refractory particles without adversely affecting the porosity of the resulting membrane.

Many materials can be used for the refractory particles, including inorganic materials such as metals, glasses, and ceramics. Among refractory ceramic particles are silicon carbide, silicon nitride, silica, alumina, zirconia, zircon, mullite, cordierite, titania, spinel, thoria, hematite, and hafnia. The properties of preferred refractory particles include a particle size and particle size distribution appropriate for the coating process with the selected support and inertness during the firing of the membrane coating.

There are a number of thermally reactive inorganic binders which may be used in a method according to this invention, including metals, glasses, ceramics, and other inorganic materials. Inorganic binders which may be used with refractory ceramic particles include glass frits, reactive ceramic particles, inorganic colloidal materials, and soluble inorganic materials.

Glass frits are especially effective as the reactive inorganic binder. When the coating is fired at a temperature at which the glass frit melts and flows, it wets and coats the refractory particles as well as the underlying support. After cooldown and solidification, the glass provides strong bonding of the refractory particles as well as excellent adhesion of the membrane coating to the support. Glass frits are readily available from several commercial sources. It is preferred to choose a glass frit with the following characteristics. First, the glass frit should have good chemical resistance for the intended end use. For example, many glasses are susceptible to attack by acid, alkali, or water, and could be extracted during the use of the bonded membrane. However, glass frits have been developed which have improved chemical resistance and are used, for example, for glazing tableware and cooking ware. Such glass frits usually are complex mixtures of borosilicates with alkali fluxes and rare earth oxides, and may contain high levels of zirconia. Second, the glass frit should have a fusion temperature in the desired range. Most glass frits melt in the range of 600°–1,200° C., and hence a glass frit can be chosen with a large temperature difference between the temperature at which it will flow and wet the refractory particles and the temperature at which the particles themselves will sinter. Third, the coefficient of expansion of the glass frit should be selected such that the bonded coating on the support will not craze or peel on cooling after firing. Fourth, the particle size of the glass frit should be approximately the same or smaller than the particle size of the refractory particles so that when the glass frit melts and flows among the refractory particles, large voids are not left behind as large pores in the membrane.

Another reactive inorganic binder is fine reactive particles, which includes reactive ceramic particles. The sintering temperature for ceramic particles decreases substantially for particles below 1 micron in size. For example, for alpha alumina particles with size above 1 micron, sintering at over 1,500° C. is required for interparticle binding. By contrast, sintering temperatures below 1,300° C. may be used for reactive alpha alumina particles in the submicron size range. Thus, coatings of mixtures of coarse alumina particles and fine reactive alumina particles allow for bonding refractory coarse alumina particles with alumina fines at a temperature well below that at which the large alumina particles themselves sinter. This is attractive for obtaining a membrane completely comprised of alpha alumina.

Other mixtures of refractory ceramic particles and reactive ceramic particles may be employed in an analogous manner. Such ceramic particles include, for example, zirconia, titania, silica, zircon, and silicon carbide.

Inorganic colloidal materials can also be used as reactive inorganic binders. Such inorganic colloidal materials can include colloidal silica, alumina, zirconia, titania, ceria, yttria, tin oxide, silicon carbide, silicon nitride, and mixtures thereof. These colloidal materials are normally suspended in aqueous media, but can also be prepared in polar solvents such as alcohols. Particle size of the inorganic colloidal materials can be in the range of from about 3 to 100 millimicrons Such inorganic colloidal materials typically react in the temperature range of 400° to 1,000° C.

Soluble inorganic materials are also suitable as reactive inorganic binders. suitable soluble inorganic materials can include nitrates or acetates of aluminum, zirconium, or other metals, or polymers such as aluminum chlorhydrate and polyaluminum chloride, or alkoxides of aluminum, zirconia, titania, silica, or other metals, or compounds such as zirconyl nitrate or chloride. On firing, such soluble inorganic materials convert to alumina, silica, titania, or zirconia.

Mixtures of inorganic colloidal materials, soluble inorganic materials, and inorganic colloidal materials with soluble inorganic materials may also be used. Such mixtures can be selected to yield chemically resistant inorganic binders on firing at moderately low temperatures.

The proportion of the reactive inorganic binder relative to the amount of refractory particles can very over a wide range. The preferred proportion depends on many factors, such as the densities of the respective materials, the degree of dissipation of the inorganic binder if it flows into the underlying support, the thickness of the coating, and the desired strength of the resultant fired membrane layer. The proportion of inorganic binder typically ranges from 2.5 wt % to 200 wt % of the weight of refractory particles, and is preferably 10 wt % to 100 wt %.

The mixture of the refractory particles and reactive inorganic binder is normally suspended in a liquid vehicle for applying a coating to a porous support by slip casting or dynamic filtration. The liquid vehicle can be water, a polar solvent such as alcohols, or a nonpolar solvent such as hydrocarbons. In addition, the mixture can contain additives such as particle wetting agents, deflocculants, antifoam agents, a soluble organic polymer useful as an organic binder/viscosity modifier, and, if aqueous, acid or alkali for pH adjustment.

The membrane is coated onto a support which has several required characteristics. These include thermal inertness at the intended firing conditions for the membrane coating. Further, the support material must have adequate permeability, related to pore size, porosity, and configuration. Finally, the support configuration and associated cost should be suitable for commercial application. The porous support onto which membranes may be usefully coated can be of many configurations, including tubular, with the coating applied to the interior or the exterior of the tube. Alternatively, the support can be a multiple passageway monolith, with the coating applied to the surfaces of the passageways. Suitable support materials include alumina, cordierite, mullite, silica, spinel, zirconia, silicon carbide, or other ceramics, carbon, stainless steel, nickel, and other metals.

After coating the support with a mixture of refractory particles and a thermally reactive inorganic binder according to this invention, the coated support is dried and fired to bond the membrane. The firing temperature is at least as high as a first temperature at which the inorganic binder reacts, but less than a second temperature at which the refractory particles sinter. By reaction of the inorganic binder is meant melting or sintering such that bonding of the refractory particles among themselves and to the support material occurs.

Multiple layers of inorganic particles can be established to form a composite porous inorganic membrane. Such a membrane is particularly useful when the support on which the membrane is formed has a pore size substantially larger than the ultimate desired pore size of membrane. In the application of multiple coatings of inorganic particles to the support to overlie a first underlying layer, each successive coating will normally contain inorganic particles smaller in size than the inorganic particles in the previously coated and underlying layer. In the first underlying layer the inorganic particles will be refractory particles; in the subsequent layers the inorganic particles may be refractory particles, fine reactive particles, or inorganic colloidal materials.

There are several methods according to this invention for forming a composite inorganic membrane. In one embodiment, a successive coating of a mixture of refractory particles smaller in size than those in the first underlying layer and an inorganic binder is applied to the previously fired support and first layer. The doubly coated support is refired at a temperature below the second temperature of the refractory particles in the first and successive layers, and until the inorganic binder in the successive layer reacts. In another embodiment, the same successive coating is applied after drying, but without firing, of the first layer.

In yet another embodiment, a successive coating of reactive ceramic particles smaller in size than the refractory particles in the first underlying layer is applied to the previously fired support and first layer. In this embodiment, the first layer inorganic binder may be other than a glass frit. The doubly coated support is refired at a temperature below the second temperature of the refractory particles in the first layer, and until the reactive ceramic particles in the successive layer sinter. In another embodiment, the same successive coating is applied after drying, but without firing, of the first layer.

In still another embodiment, a successive coating of reactive ceramic particles smaller in size than the refractory particles in the first underlying layer is applied to the previously fired support and first layer. In this embodiment, the first layer inorganic binder is a glass frit which can melt and flow into the successive layer on firing. The doubly coated support is refired at a temperature below the second temperature of the refractory particles in the first layer, and until the glass frit in the first layer melts and flows into the successive layer. In another embodiment, the same successive coating is applied after drying, but without firing of the first layer.

The above embodiments describe several methods for fabrication of two-layer composite porous inorganic membranes. The methods can be extended to multiple layer inorganic composite membranes by applying further successive coatings. Included in such successive coatings can be a very fine-pored layer formed by coating with a suspension of inorganic colloidal material.

There are several advantages for the formation of porous inorganic membranes according to the present invention. First, careful control of the firing time-temperature profile is not necessary because the firing temperature can be selected well above the temperature at which the reactive inorganic binder melts or sinters to bond the refractory particles and well below the temperature at which the refractory particles sinter. Second, membrane supports with a relatively low temperature capability can be used for membranes prepared from refractory particles which sinter at a relatively high temperature. Third, dissimilar materials may be more readily used for the refractory particles and porous support. If a glass frit is used as the reactive inorganic binder, one can be selected to adjust the coefficient of expansion of the coated layer to more closely approach that of the underlying support. The firing at a temperature required to melt the glass frit, which is much lower than the sintering temperature of the refractory particles, reduces the tendency of the coating to craze or peel when dissimilar materials are used for the support and coating. This is because the temperature at which the glass frit solidifies on cooldown can be very low relative to the sintering temperature for the refractory particles. This results in a relatively small temperature differential between the inorganic binder solidification temperature and ambient temperature, and minimizes the cooldown stress generated in the coating arising from differences in coefficients of expansion of the support and applied coating. Additionally, the use of a glass frit enables annealing at relatively low temperature of the composite structure to eliminate stress. Similar considerations apply when a low sintering temperature inorganic colloidal material is used as the inorganic binder. Fourth, low temperature firing results in lower cost production both through the use of inexpensive furnaces and low energy cost.

The invention is illustrated by way of example, but without limitation, by the following embodiments.

EXAMPLE 1

A porous cordierite honeycomb monolith from Corning Glass Works was used as a membrane support. The monolith was a cylinder with a one-inch diameter and two-inch length. The monolith had 76 parallel square passageways having a size of 0.083 inch. The total superficial surface area of the passageways, onto which the membrane was coated, was 0.35 square feet. The porosity of the cordierite was about 37%, and the mean pore size was about 12 microns.

The monolith passageways were coated by slip casting. The passageways were filled with a casting slip which was held in the passageways for a few seconds and drained. Excess slip was removed by blowing out with air.

A first coating was made with a slip of the following composition; all values are weight percent:

isopropyl alcohol, 39.3%

12 micron alumina powder (Norton Company type 7920), 43.2% glass frit, ground in a jet mill to a mean particle size of about 3 microns (Mobay Chemical Corporation type P930), 14.4% polyvinylpyrrolidone, as a deflocculant, (GAF Corporation, type K/15), 0.55% parahydroxybenzoic acid, as a deflocculant, 0.55% polyvinylpyrrolidone, as an organic binder/viscosity modifier, (GAF Corporation, type K/90), 2.0%

The above slip was mixed vigorously with a magnetic stirrer in a beaker for four hours before using. After coating, the monolith was dried in air at room temperature for 30 minutes and in an oven at 200° F. for two hours.

The monolith was then coated with a second coating, in the same manner as above. The second slip had the following composition; all values are weight percent:

isopropyl alcohol, 56.2%

1.5 micron alumina powder (Alcoa Company of America, type A-152), 29.4% glass frit, ground in a jet mill to a mean particle size of about 3 microns (Mobay Chemical Corporation, type P930), 9.8% polyvinylpyrrolidone, as a deflocculant, (GAF Corporation, Type K/15), 0.9% parahydroxybenzoic acid, as a deflocculant, 0.9% polyvinylpyrrolidone, as an organic binder/viscosity modifier, (GAF Corporation, type K/90), 2.8%

Prior to addition of the organic binder/viscosity modifier, the slip was mixed vigorously for several hours with a magnetic stirrer and was further dispersed by ball milling for 12 hours. The organic binder/viscosity modifier was then mixed in with a magnetic stirrer for one hour. After coating, the monolith was dried in the same manner as for the first coating.

The monolith was then fired in an electric kiln to cone 1 (1,179° C.). The heating rate was approximately 1° C. per minute until the inorganic binder/viscosity modifier burned off at about 460° C. The firing rate was increased to the maximum rate to obtain the final firing temperature in about three hours. Cooldown was 5° C. per minute until 700° C. was reached, after which the rate was reduced to approximately 1° C. per minute until the kiln temperature was near ambient temperature. The above firing cycle accounted for the incipient fusion point of the glass frit of 675° C., and its melting range of 815°-870° C. The peak temperature was adequate to achieve full fusion and flow of the glass frit. The cooldown cycle was slowed as the incipient fusion point was approached to minimize stress on the coating as it cooled below the glass solidification temperature.

The membrane adhered very strongly to the cordierite substrate and was crack-free. This was achieved in spite of the very large differences in coefficients of expansion of the substrate in the membrane layers: the support coefficient of expansion was $1-1.2 \times 10^{-6}/°$ C.; that of the alumina was approximately $7-8 \times 10^{-6}$; and that of the glass frit was $6.8 \times 10^{-6}$.

The membrane was tested for water flux with ultrafiltered water and for rejection characteristics with a monodisperse latex suspension. Water flux was 785 gallons per day per square foot at about 3 psi applied pressure differential. The rejection of 0.99 micron latex particles was 62%.

EXAMPLE 2

A membrane sample was prepared in the same manner as in Example 1. A third coating was applied by slip casting with a slip of the following composition; all values are weight percent:

isopropyl alcohol, 55.8%

0.3 micron alumina powder (Alcoa Company of America, type A-16), 40.6% polyvinylpyrrolidone, as a deflocculant, (GAF Corporation, type K/15), 1.0% parahydroxybenzoic acid, as a deflocculant, 1.0% polyvinylpyrrolidone, as an organic binder/viscosity modifier, (GAF Corporation, type K/90), 1.6%

Prior to addition of the organic binder/viscosity modifier, the slip was mixed vigorously for several hours with a magnetic stirrer and was further dispersed by ball milling for 24 hours. The organic binder/viscosity modifier was then mixed in for one hour using a magnetic stirrer.

After coating, the monolith was dried in the same manner as for the coating in Example 1. The monolith was recoated and dried a second time. The monolith was then fired in an electric kiln with the same firing cycle as in Example 1.

The membrane adhered strongly to the cordierite substrate, and the new membrane layer adhered very strongly to the initial fired membrane layers. The water flux was 750 gallons per day per square foot and an applied pressure differential of 15 psi. Rejection for 0.99 micron latex particles was 99%, for 0.49 micron particles was 99%, for 0.15 micron latex particles was 88%, and for 0.067 micron latex particles was 73%.

EXAMPLE 3

A cordierite monolith of the same type as in Example 1 was coated in the same manner with a slip of the following composition; all values are in weight percent:

isopropyl alcohol, 42.2%

4.0-4.4 micron zircon powder (TAM Ceramics, Inc., type "zircon milled fine"), 40.6% glass frit, ground in a jet mill to a mean particle size of about 3 microns (0. Hommel Company, type 3GF-272-B), 13.6% polyvinylpyrrolidone, as a deflocculant, (GAF Corporation, type K/15), 0.5% parahydroxybenzoic acid, as a deflocculant, 0.5% polyvinylpyrrolidone, as an organic binder/viscosity modifier, (GAF Corporation, type K/90), 2.6%

The slip was mixed vigorously with a magnetic stirrer in a beaker for four hours before using. After coating, the monolith was dried in air at room temperature for 30 minutes and in an oven at 200° F. for two hours. The membrane was then fired with the same firing cycle used in Example 1, taking into account the softening point of the frit of about 700° C.

A second coating was applied by slip casting with a slip of the following composition; all values are weight percent:

isopropyl alcohol, 62.9%

0.55 micron zircon powder (TAM Ceramics, Inc., type Encelopax), 33.3% polyvinylpyrrolidone, as a deflocculant, (GAF Corporation, type K/15), 0.7% parahydroxybenzoic acid, as a deflocculant, 0.7% polyvinylpyrrolidone, as an organic binder/viscosity modifier, (GAF Corporation, type K/90), 2.4%

Prior to the addition of the organic binder/viscosity modifier, the slip was mixed vigorously for several hours with a magnetic stirrer and was further dispersed by ball milling for 24 hours. The organic binder was then mixed in with a magnetic stirrer.

After coating, the monolith was dried in air at room temperature for 30 minutes and in an oven at 200° F. for two hours. A second coating was applied and dried in an identical manner. The membrane was then fired with the same firing cycle used in Example 1.

The membrane adhered very strongly to the cordierite substrate and was crack-free. Adhesion of the second layer to the first was excellent. Both were achieved in spite of the large differences in coefficients of expansion of the substrate and the membrane layers: the substrate coefficient of expansion was $1-1.2 \times 10^{-6}/°$ C.; that of the zircon was about $4-5 \times 10^{-6}$; and that of the frit was $5.2 \times 10^{-6}$.

The water flux was 325 gallons per day per square foot at an applied pressure differential of 10 psi. The rejection of 0.99 micron latex particles was 99%; for 0.49 micron particles was 99%; for 0.15 micron latex particles was 80%; and for 0.067 micron latex particles was 13%.

EXAMPLE 4

A cordierite monolith of the same type as that of the above examples was selected as the support. This monolith was a cylinder of the same overall dimensions, but had 16 passageways of dimension 0.164 inch. The total passageway area onto which membranes were coated was 0.15 square feet.

The monolith was coated with the first slip of Example 3 only, and dried and fired in a like manner. The monolith was then coated with the slip of Example 2 and dried. It was then recoated with the same slip, dried, and fired according to the firing schedule of Example 1.

The water flux was 750 gallons per day per square foot at an applied pressure differential of 20 psi. Rejection of 0.99 micron latex particles was 99%; for 0.49 micron particles was 99%; for 0.15 micron latex particles was 98.2%; and for 0.067 micron latex particles was 96.6%.

EXAMPLE 5

The procedure employed to make the membrane sample of Example 4 was repeated, but without intervening firing of the first coating. The membrane performance was comparable to that of Example 4.

EXAMPLE 6

A cordierite monolith of the same type as in Example 4 was coated in the same manner as the first coating of Example 1 except that the reactive inorganic binder was well-dispersed Alcoa A-16 instead of the P-930 glass frit. After drying as in Example 1, and without intervening firing, the monolith was coated with the slip of Example 2 and dried in the same manner as in Example 2. The monolith was then fired. The firing cycle was performed in a similar manner to that in the above examples except that firing was carried out to cone 8 (1,300° C.) at which temperature the A-16 sintered to bind the first coating layer and to form a sintered membrane top layer. The firing cycle required about five hours after the organic binder/viscosity modifier burned off to reach peak temperature.

The membrane adhesion to the substrate was good, but not so strong as that obtained with glass frits. The adhesion between membrane layers was also good.

The water flux was 975 gallons per day per square foot at an applied pressure differential of 20 psi. The rejection of 0.99 micron latex particles was 98+%, for 0.49 micron particles was 98+%, for 0.15 micron latex particles was 94.7%, and for 0.067 micron latex particles was 87.7%.

EXAMPLE 7

To demonstrate the effectiveness of inorganic colloidal materials as inorganic binders, various aqueous suspensions of the Norton Company 12 micron alumina of Example 1 were mixed with colloidal oxides. These suspensions were used to coat by dip coating flat surfaces of a porous cordierite with a mean pore size of 3 to 4 microns. The coated surfaces were dried in air and fired to cone 1. The procedure for mixing the suspensions consisted of mixing the alumina powder into the colloidal suspensions with a magnetic mixer, followed by addition of cellulose ether binder solution. The following constituents were used in mixing the suspensions:

colloidal silica type 2034DI, Nyacol Products, Inc. This colloidal silica is largely sodium-free, has a particle size of 20 millimicrons, a pH of 3.0, and contains 34 wt % $SiO_2$.

aluminum chlorhydrate, 50% solution, Courtney Industries, Inc. This soluble aluminum oxide polymer has a pH of 4.2 and contains 23.5 wt % $Al2O3$.

colloidal alumina type AL20, Nyacol Products, Inc. This colloidal alumina is a pseudoboehmite suspension with a pH of 4.0, a nominal particle size of 20 millimicrons, and an alumina content of 20 wt %.

colloidal zirconia, Nyacol Products, Inc. This colloidal zirconia has a particle size of 5 to 10 a pH of millimicrons 3.0–3.6, and contains 20 wt % of $ZrO_2$.

6% solution of cellulose ether type Methocel 20-121, manufactured by the Dow Chemical Company.

| Suspension 1: Colloidal silica |
|---|
| 7.5 g 12 micron alumina |
| 7.4 g colloidal silica suspension |
| 2.0 g Methocel 20-121 solution |

| Suspension 2: Mixed colloid of composition 66 wt % silica 33 wt % alumina |
|---|
| 7.5 g 12 micron alumina |
| 4.9 g colloidal silica suspension |
| 3.6 g alumina chlorhydrate solution |
| 2.0 g Methocel 20-121 solution. |

| Suspension 3: Mixed colloid of composition 40 wt % silica and 60 wt % alumina |
|---|
| 7.5 g 12 micron alumina |
| 3.0 g colloidal silica suspension |
| 6.4 g alumina chlorhydrate solution |
| 2.0 g Methocel 20-121 solution |

| Suspension 4: Colloidal alumina |
|---|
| 7.5 g 12 micron alumina |
| 12.5 g colloidal alumina suspension |
| 2.0 g Methocel 20-121 solution |

| Suspension 5: Colloidal zirconia |
|---|
| 7.5 g 12 micron alumina |
| 12.5 g colloidal zirconia suspension |
| 2.0 g Methocel 20-121 solution |

For suspensions 2 and 3, the colloidal silica and aluminum chlorhydrate complexed on mixing to increase viscosity, but did not precipitate.

Coatings from all five suspensions were susceptible to cracking on drying and firing, especially if thick films were coated and dried and fired with a short cycle. However, fired coatings from all five suspensions were highly porous, strongly bound and adhered well to the cordierite substrate. Coatings prepared without the colloidal binders were powdery and easy to remove from the cordierite substrate by light brushing.

Other embodiments will occur to those skilled in the art and are within the following claims:

What is claimed is:

1. A membrane separation device comprising:
    a porous support; and
    a porous inorganic separation membrane adhered to said support,
    said membrane including non-fibrous refractory particles bound to each other and to said support by a thermally reactive inorganic binder which reacts at a temperature below that temperature which said refractory particles react and below that temperature which said support reacts.

2. The membrane device of claim 1 in which the refractory particles are ceramic.

3. The membrane device of claim 2 in which the refractory particles are selected from the group consisting of silicon carbide, silicon nitride, silica, alumina, zirconia, zircon, mullite, cordierite, titania, spinel, thoria, hematite, hafnia, and mixtures thereof.

4. The membrane device of claim 1 in which the inorganic binder includes a glass frit.

5. The membrane device of claim 1 in which the inorganic binder includes reactive ceramic particles.

6. The membrane device of claim 5 in which the size of the reactive ceramic particles is smaller than one micron.

7. The membrane device of claim 1 in which the inorganic binder includes an inorganic colloidal material.

8. The membrane device of claim 7 in which the particle size of the inorganic colloidal material is from 3 to 1000 millimicrons.

9. The membrane device of claim 7 in which the inorganic colloidal material is selected from the group consisting of colloidal silica, alumina, zirconia, titania, ceria, yttria, tin oxide, silicon carbide, silicon nitride, and mixtures thereof.

10. The membrane device of claim 1 in which the inorganic binder is derived from a soluble inorganic material.

11. The membrane device of claim 10 in which the inorganic binder is selected from the group consisting of alumina, silica, titania, and zirconia.

12. The membrane device of claim 1 in which the content of the inorganic binder in the mixture ranges from 2.5 wt % to 200 wt % relative to the weight of the refractory particles.

13. The membrane device of claim 1 in which the content of the inorganic binder in the mixture ranges from 10 wt % to 100 wt % relative to the weight of the refractory particles.

14. The membrane device of claim 1, in which the porous support is a ceramic honeycomb monolith having passageways and the inorganic membrane is adhered to the surfaces of the monolith passageways.

15. The membrane device of claim 1 having at least two successive porous inorganic separation membrane layers.

16. The membrane device of claim 1 wherein the refractory particles sinter at a relatively high temperature and the porous support reacts at a relatively low temperature.

17. The membrane device of claim 1 wherein the inorganic binder and the refractory particles are dissimilar materials.

18. A membrane separation device comprising;
a porous support; and
a porous inorganic separation membrane having a rejection for 0.99 micron latex particles of at least about 98%, said membrane being adhered to said support and including non-fibrous, thermally refractory particles bound to each other and the support by a thermally reactive inorganic binder which binder reacts at a temperature below that temperature at which said refractory particles react.

19. The membrane device of claim 18, having a rejection for 0.49 micron latex particles of at least about 98%.

20. The membrane device of claim 18, having a rejection for 0.15 micron particles of at least about 98%.

21. A membrane separation device having an inorganic membrane on a porous support for use in membrane separation prepared by the method of:
(a) applying a coating of a mixture of thermally refractory particles and a thermally reactive inorganic binder to the porous support to form a first layer, the inorganic binder reacting at a first temperature which is lower than a second temperature at which the refractory particles sinter;
(b) firing the support to a firing temperature at least as high as the first temperature and less than the second temperature to react the inorganic binder; and
(c) cooling the support to form the porous inorganic separation membrane from the first layer having the refractory particles bound to each other and to the support by the inorganic binder to establish the membrane device.

22. The membrane device of claim 21 wherein the reactive inorganic binder are ceramic particles less than one micron in size.

23. The membrane device of claim 21 wherein the support is a porous monolith having a plurality of passageways and the coating is applied on the wall surfaces of the monolith passageways.

24. The membrane device of claim 21 including applying at least one successive coating of inorganic particles to the support to overlie the first layer.

25. The membrane device of claim 24 wherein at least one of the successive coatings is a mixture of refractory particles as the inorganic coating particles and a thermally reactive inorganic binder, and the method further includes:
(a) applying the mixture to the support after cooling the support;
(b) refiring the support to a firing temperature less than the second temperature of the refractory particles in any underlying later and in the successive coating until the inorganic binder in the successive coating reacts; and
cooling the support to form a composite porous inorganic membrane.

26. A membrane separation device having an inorganic membrane on a porous support for use in membrane separation prepared by the method of:
(a) mixing refractory ceramic particles, a thermally reactive inorganic binder which reacts at a first temperature lower than a second temperature at which the refractory ceramic particles sinter, and a liquid vehicle;
(b) applying the mixture to the support to establish a coating on the support;
(c) drying the support to drive off the liquid vehicle from the coating;
(d) firing the support to a firing temperature at least as high as the first temperature and less than the second temperature to react the inorganic binder; and
(e) cooling the support to form the porous membrane having the refractory ceramic particles bound to each other and to the support by the inorganic binder.

* * * * *